US005507370A

United States Patent [19]
White et al.

[11] Patent Number: 5,507,370
[45] Date of Patent: Apr. 16, 1996

[54] HEAT SINK FOR VEHICLE WHEEL ASSEMBLY

[75] Inventors: Jay D. White, Galesburg; Ralph W. Larson, Olivet, both of Mich.

[73] Assignee: Eaton Corporation, Cleveland, Ohio

[21] Appl. No.: 356,765

[22] Filed: Dec. 15, 1994

[51] Int. Cl.$^6$ ................................................ F16D 65/78
[52] U.S. Cl. ..................................... 188/264 G; 301/691
[58] Field of Search ...................... 188/264 R, 264 AA, 188/264 G; 301/6.1, 6.91, 6.2, 36.1

[56] References Cited

U.S. PATENT DOCUMENTS

| | | | |
|---|---|---|---|
| 1,769,903 | 7/1930 | Baker | 301/6.91 X |
| 2,059,170 | 6/1932 | Farr | 301/6 |
| 2,646,862 | 7/1953 | Dodge | 188/264 R |
| 2,655,237 | 10/1953 | Benson | 188/264 AA |
| 2,998,870 | 9/1961 | Herman et al. | 188/264 |
| 5,320,201 | 6/1994 | White | 188/264 A |

FOREIGN PATENT DOCUMENTS 714997  9/1954  United Kingdom.

Primary Examiner—Robert J. Oberleitner
Assistant Examiner—Peter M. Poon
Attorney, Agent, or Firm—Loren H. Uthoff, Jr.; Howard D. Gordon

[57] ABSTRACT

A heat sink having an annular conductive section disposed between a brake drum and a wheel assembly with a plurality of convective sections extending from the conductive section through a like number of hand-hold apertures formed in the wheel assembly. In an alternative embodiment, the heat sink has a hollow section formed in each convective section extending into the conductive section where the hollow section is at least partially filled with a heat conductive material that undergoes a phase change to further enhance the heat transfer from the conductive section to the convective section.

4 Claims, 3 Drawing Sheets

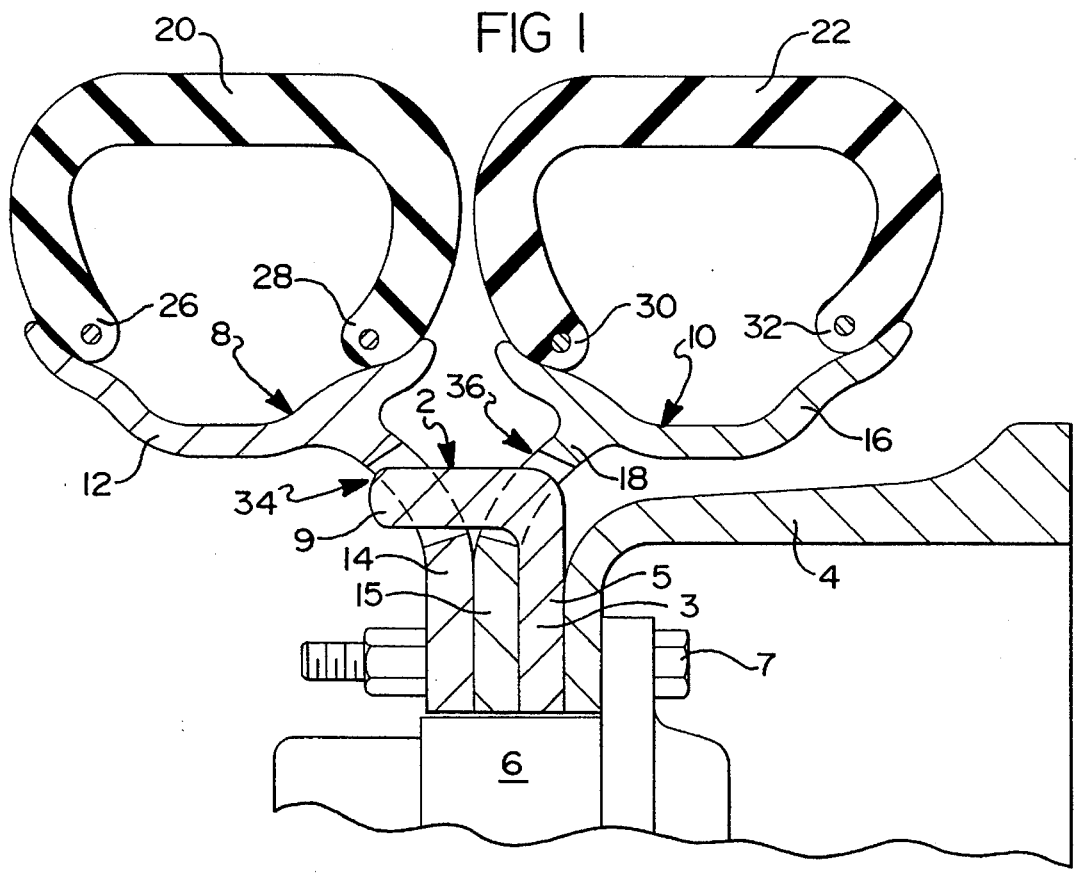
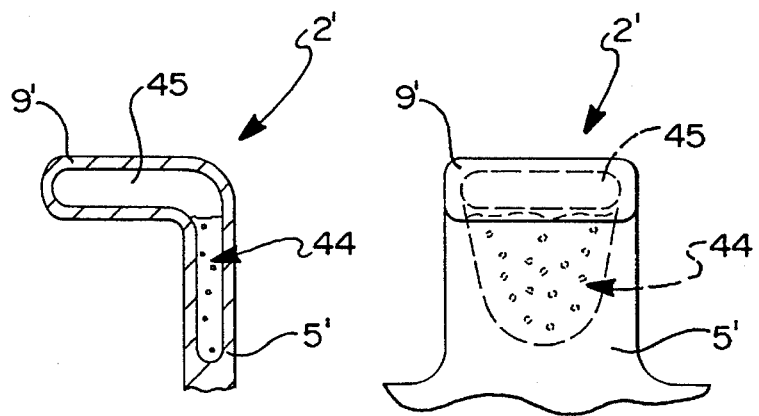

HEAT SINK FOR VEHICLE WHEEL ASSEMBLY

BACKGROUND OF THE INVENTION

1. Field of the Invention

The present invention relates to a heat sink. More specifically, the present invention relates to a heat sink for a vehicle wheel which is disposed between the wheel and a brake drum.

2. Description of the Prior Art

In order to brake a vehicle such as an automobile or truck moving horizontally, the kinetic energy of the entire mass of the vehicle must be converted to heat. There is some energy conversion by aerodynamic drag on the vehicle, engine compression, fluid temperature in the transmission and rolling friction of the wheels relative to the road surface, for example. However, the primary mechanism of conversion of this energy to heat is the vehicle brake system. Heat generation rates vary greatly in vehicle brake systems and adequate provision must be made for the dissipation of high heat loads in a short period of time.

When drum brakes are used, the heat is removed from interfacial sliding surfaces. These surfaces may include the brake drum as well as the brake shoes. The brake drum is a fairly massive heat sink, is engaged throughout a relatively large arcuate portion of its internal cylindrical braking surface by the brake shoes, and has the outer surface cooled by convection currents of air. The brake pad shoes have little or no heat sink capability so that most of the heat generated by braking passes directly into the drum. Power input into the drums can heat the internal surface metal of the drum to high temperatures above the 1000° F. range. Much of the heat in the drum is temporarily stored in the surface layer of the metal, and is transferred toward the drum outer surface. The temperature gradient decreases toward the outer surface and heat flows into the wheel(s) and to the air until the drum is cool, This often takes an extended period of time, and drums, wheels and tires may be heated beyond the desired level under severe conditions of repeated heavy braking.

The problem of removal of heat has been attacked by providing heat sinks, air cooling, and liquid cooling. A variety of airflow enhancement devices and designs have been applied to the wheel and brake drum to lower the system operating temperature. British Patent No. 714,997, published Sep. 8, 1954 and U.S. Pat. Nos. 5,320,201; 4,135,764; 2,998,870; and 2,059,170 illustrate the types of devices employed to date in an attempt to lower the temperature of the various brake and wheel system components.

Heat conducted from a vehicle brake drum into the wheel can be a significant factor in the reduction in service life of a tire. Under severe braking events or a sequence of events, the brake system and wheel components can reach elevated temperatures. Heating of the tire can result in chemical changes that cause a breakdown in the structure of the tire. Thus, the temperature of the wheel, especially where the tire contacts the wheel, is important when considering the life expectancy of the tire/wheel/brake system.

SUMMARY OF THE INVENTION

A vehicle wheel and brake assembly is disclosed which exhibits an increase in the conductive and convective heat transfer to the surrounding air due to the heat sink of the present invention which is clamped between the wheel and the brake drum. The heat sink conducts heat generated by the brake assembly away from the wheel flange through a conductive section which is transferred to a convective section of the heat sink that extends through the wheel hand-hold openings into the surrounding airflow.

In an alternate embodiment, a hollow section is formed in the heat sink which extends from the conductive section to the convective section and is filled with a material that ideally goes through a phase change from a solid to a liquid or liquid into a gas at approximately the upper operating temperature range of the wheel and brake assembly. The heat of transformation of the fill material further enhances the cooling capacity of the heat sink.

One provision of the present invention is to reduce the operating temperature of a vehicle wheel using a heat sink.

Another provision of the present invention is to reduce the operating temperature of a vehicle wheel using a heat sink which is clamped between the wheel and the brake drum.

Another provision of the present invention is to lower the operating temperature of a vehicle wheel using a heat sink having a conductive section which is clamped between the wheel and the brake drum where the heat sink has a convective section.

Another provision of the present invention is to lower the operating temperature of a vehicle wheel using a heat sink having a conductive section which is clamped between the wheel and the brake drum where the heat sink has a convective section which extends through hand-hold openings in the wheel.

Still another provision of the present invention is to lower the operating temperature of a vehicle wheel using a heat sink which is clamped between the wheel and the brake drum where the heat sink has a hollow section filled with a heat conductive substance formed in the conductive section and the convective section.

BRIEF DESCRIPTION OF THE DRAWINGS

FIG. 1 is a partial cross-sectional view of the heat sink of the present invention clamped between tandem wheels and a brake drum;

FIG. 2 is a cross-sectional view of an alternate embodiment of the heat sink of the present invention;

FIG. 3 is a frontal view of the alternate embodiment of the present invention as shown in FIG. 2;

DETAILED DESCRIPTION OF THE PREFERRED EMBODIMENT

Figure 4:
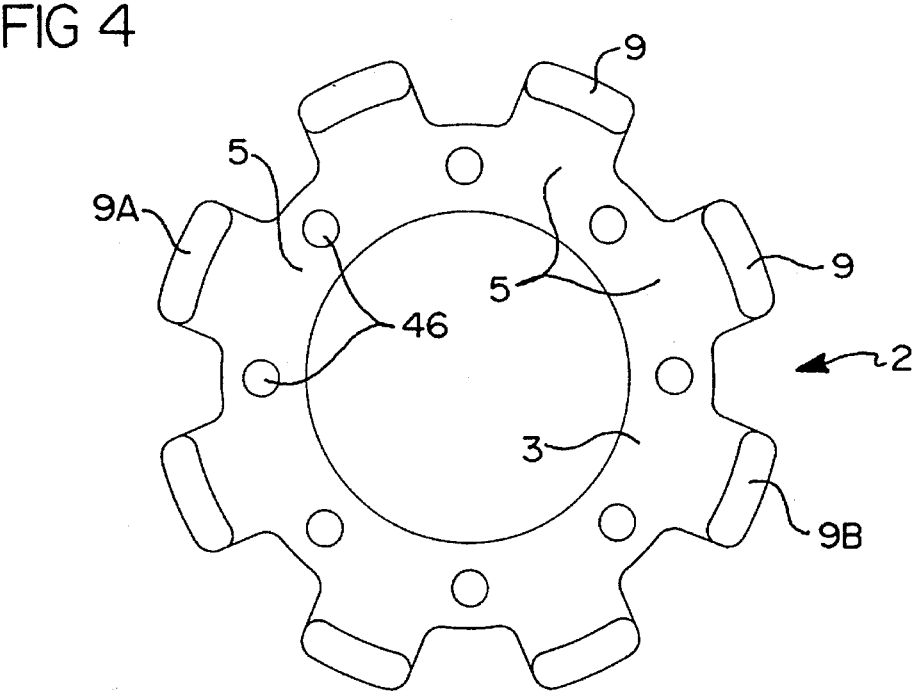
FIG. 4 is a plan view of the heat sink of the present invention.

In this disclosure, certain terminology will be used for convenience and reference only and will not be limiting. For example, the terms "rightward" and "leftward" will refer to directions in the drawings connection with which the terminology is used. The terms "inwardly" and "outwardly" will refer to directions toward and away from, respectively, the geometric center of the apparatus being described. The terms "upward" and "downward" refer to directions as taken in the drawings connection with which the terminology is used. All foregoing terms include normal derivatives and equivalents thereof.

Now referring to FIG. 1, a partial cross-sectional view of the heat sink 2 of the present invention clamped between tandem inner and outer wheels 8 and 10 and a brake drum 4 is shown. The brake drum 4 is attached to a wheel hub 6 using a threaded fastener 7 which extends to also fasten the heat sink 2 at a heat conduction ring 3, the inner wheel 10 at an inner flange 15 and the outer wheel 8 at an outer flange 14. Thus, the outer flange 14, the inner flange 15 and the heat conduction ring 3 are squeezed together against the brake drum 4.

Ideally, the heat sink 2 which is annular in shape and consists of a plurality of heat conductive sections 5 which are joined together to form the heat conduction ring 3 is made out of a highly thermally conductive material such as aluminum or an aluminum alloy to maximize the heat transfer from the brake drum 4 thereby lowering the temperature of the outer wheel 8 and the inner wheel 10 especially where the tire beads 26, 28, 30 and 32 contact the wheel rims 12 and 16 respectively.

Hand-hold openings 34 are formed in the flange 14 of the outer wheel 8 and likewise hand-hold openings 36 are formed in the flange 15 of the inner wheel 10. The hand-hold openings 34 and 36 are well known in the art and facilitate handling of the wheel during assembly and disassembly. The hand-hold openings 34 also increase airflow across the surface of the brake drum 4 thereby increasing the convective heat transfer over the outside surface of the brake drum 4 to lower operating temperatures of the brake drum 4 and the wheels 8 and 10.

The heat sink 2 is formed of two sections, a plurality of heat conductive sections 5 which are joined together to form the conduction ring 3 which is clamped against the brake drum 4 and functions to conduct heat from the brake drum 4 into a plurality of convective sections 9. One convective section 9 is shown in FIG. 1 as it extends through the hand-hold openings 34 and 36 and functions to dissipate the heat transferred from the conductive section 5 into the surrounding air through a convective heat flow process. Thus, by inserting the heat sink 2 of the present invention between the brake drum 4 and the inner wheel 10 at its flange 15, a quantity of heat is dissipated by the heat sink 2 prior to its conduction into the flange 15 which lowers the operating temperature of the outer wheel 8 and the inner wheel 10. By lowering the operating temperature of the wheels 8 and 10, especially at the tire beads 26,28,30 and 32, the tire life is significantly extended since the chemical composition of the tire is affected by high temperature and causes the tire bead areas to reach a point of material break-down, the severity of which depends on both time and temperature.

To improve the heat transfer effectiveness of the heat sink 2, portions of the conductive section 5' and the convective section 9' can be made hollow as shown in FIG. 2 as an alternate embodiment heat sink 2'. The heat sink 2' has a hollow section 45 partially filled with a heat conductive fill material 44 such as sodium which ideally undergoes a phase change around the maximum temperature that can be tolerated at the heat sink 2' to assure a safe operating temperature limit at the beads 26, 28, 30 and 32 of tires 20 and 22. The sodium fill material 44 goes through a transformation in physical state from a solid to a liquid and draws heat from the conductive section 5' by what is known in the art as the latent heat of transformation. After the sodium is in a liquid state, it moves freely between the conduction section 5' to the convective section 9' thereby improving the rate of heat transfer between the sections 5' and 9'. This improved heat transfer process results in additional cooling of the brake drum 4 and the wheel flanges 14 and 15. Generally, the sodium fill material 44 can be any material having a high thermal conductivity that undergoes a phase change below the critical operating temperature at the conductive section 5'. The maximum desired temperature at the conductive section 5' is typically around 225° F. The phase change can be from any material state to another state such as from a liquid to a gas. Thus, a fill material 44 could be ordinary water which undergoes a phase change from a liquid to a vapor at 212° F.

Now referring to FIG. 3, a front plan view of the heat sink 2' of the alternate embodiment of the present invention of FIG. 2 is shown. The material fill 44 is shown in a settled state accumulated in the lower half of the cavity 45. As the hub 6 is rotated, the orientation of the cavity 45 and the fill material 44 with respect to gravity causes the fill material 44 to shift from the conductive section 5' to the convective section 9' assuming it is in a liquid state.

Now referring to FIG. 4, a plan view of the heat sink 2 of the present invention is shown. A plurality of convective sections 9 are shown attached to conductive sections 5 which make up the conduction ring 3 having mounting holes 46 formed therein to accommodate a like number of fasteners 7 as shown in FIG. 1. The number of convection sections 9 can be made to match the number of hand-hold openings 34 and 36 of the wheels 20 and 22 or a portion thereof where two diametrically opposed convective sections 9A and 9B can be removed to provide space through respective wheel hand-hold openings for tire valve stems (not shown) to pass through.

In the preferred embodiment, the heat sink is made from a solid aluminum alloy material that provides for structural integrity while providing a high level of heat conductivity. The mounting holes 46 allow for a like number of threaded fasteners 7 to be used to secure the brake drum 4, the heat sink 2, the inner wheel 10 and the outer wheel 8 to the wheel hub 6. Commonly a similar configuration of mounting holes are formed in the attached components as shown in FIG. 1.

Figure 5:
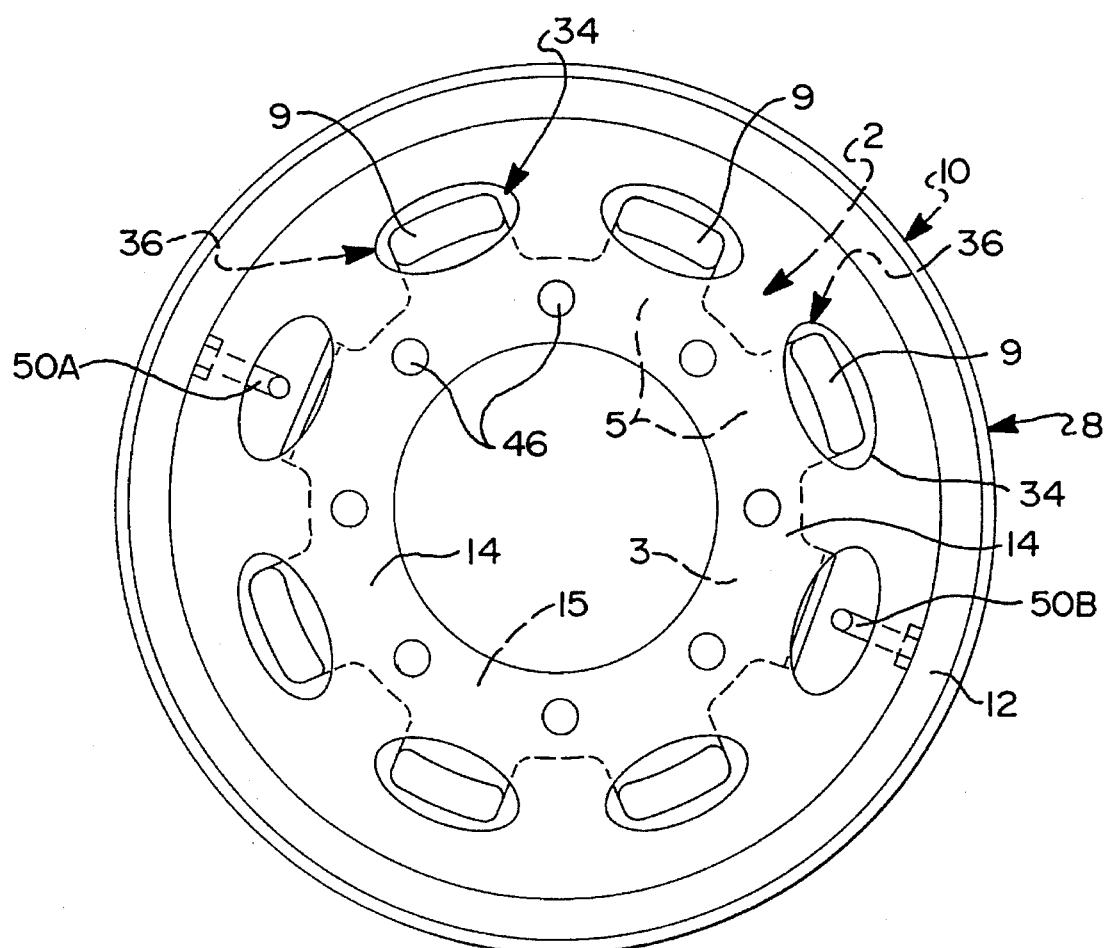
FIG. 5 is a perspective view of the heat sink of the present invention mounted to a wheel.

FIG. 5 is a plan view of the heat sink 2 of the present invention fitted to the outer and inner wheels 8,10. The mounting holes 46 are congruent between the outer and inner wheels 8, 10 and the heat sink 2. The convection sections 9 of the heat sink 2 pass through the hand-hold openings 34 and 36 of the outer and inner wheels 8 and 10 respectively. Convective sections 9A and 9B (see FIG. 4) have been removed thereby providing space for tire stems 50A and 50B to pass through.

The conductive sections 5 of the heat sink 2 are joined to form the conduction ring 3 and are clamped to the backside of the wheel flanges 14 and 15 and conduct heat to the convective sections 9 which extend through the hand-hold openings 34 and 36 into the airstream. The heat sink 2 is shown as being made of one homogeneous material such as aluminum alloy but it is contemplated that a variety of heat conductive materials could be utilized either alone or in various combinations to achieve the objectives of the present invention.

Figure 6:
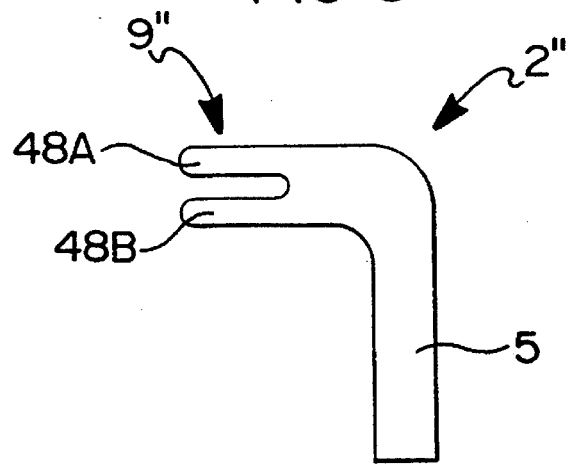
FIG. 6 is a cross-sectional view of an alternate embodiment of the heat sink of the present invention.
Figure 7:
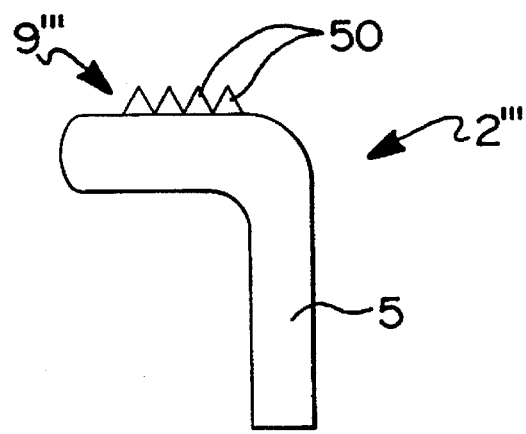
FIG. 7 is an alternate embodiment of the heat sink of the present invention.

Also, the convective sections 9 could be configured to improve the rate of convective heat transfer using fins formed in or on the convective section 9. Such an alternative embodiment is shown in FIG. 6 where two or more fins 48A and 48B extend to form the convective section 9" of the heat sink 2". In this manner, the rate of convective heat transfer is increased over the solid convective section 9 without using the hollow section 45 and fill material 44 of the alternate embodiment shown in FIGS. 2 and 3. A variety of fin designs could be utilized such as individual pin-fins 50 formed on the surface of the convective section 9''' of an alternate embodiment of the heat sink 2''' as shown in FIG. 7. These pin-fins 50 are randomly positioned on the surface of the convective section 9''' and can be a variety of shapes such as square or conical or pyramid.

It will be appreciated by those of ordinary skill in the art that many variations in the foregoing preferred embodiments are possible while remaining within the scope of the present invention. The present invention should thus not be considered limited to the preferred embodiments or the specific choices of materials, configurations, dimensions, applications or ranges of parameters employed therein, but only by the claims as herein follows.

We claim:

1. A heat sink for a brake drum and wheel assembly comprising:

an annular conductive section disposed between said brake drum and said wheel assembly, said wheel assembly comprising an outer wheel and an inner wheel, said outer wheel having an outer mounting flange extending from an outer wheel rim, and said inner wheel having an inner mounting flange extending from an inner wheel rim, and said outer mounting flange and said inner mounting flange having aligned hand-hold apertures formed therein, said conductive section being clamped between said inner mounting flange and said brake drum; and a plurality of convective sections extending from said conductive section and formed to extend individually through a select number of said hand-hold apertures.

2. A heat sink for a brake drum and wheel assembly comprising:

an annular conductive section disposed between said brake drum and said wheel assembly, said wheel assembly having hand-hold apertures formed therein;

a plurality of convective sections extending from said conductive section and formed to extend individually through a select number of said hand-hold apertures, said convective sections having hollow sections formed therein where said hollow sections are at least partially filled with a heat conductive material.

3. A heat sink for a brake drum and wheel assembly comprising:

an annular conductive section disposed between said brake drum and said wheel assembly, said wheel assembly having hand-hold apertures formed therein;

a plurality of convective sections extending from said conductive section and formed to extend individually through a select number of said hand-hold apertures, said convective sections having hollow sections formed therein where said hollow sections are at least partially filled with a heat conductive material which undergoes a phase change at approximately the desired maximum temperature of said conductive section.

4. A heat sink for a brake drum and wheel assembly comprising:

an annular conductive section disposed between said brake drum and said wheel assembly, said wheel assembly having hand-hold apertures formed therein;

a plurality of convective sections extending from said conductive section and formed to extend individually through a select number of said hand-hold apertures, said convective sections having hollow sections formed therein where said hollow sections are at least partially filled with sodium.

* * * * *